(12) United States Patent
Supino (10) Patent No.: US 8,797,673 B2
(45) Date of Patent: Aug. 5, 2014

(54) ADAPTIVE LATTICE PREDICTIVE FILTER

(75) Inventor: Lou Supino, Niwot, CO (US)

(73) Assignee: Seagate Technology LLC, Cupertino, CA (US)

( * ) Notice: Subject to any disclaimer, the term of this patent is extended or adjusted under 35 U.S.C. 154(b) by 350 days.

(21) Appl. No.: 13/162,015

(22) Filed: Jun. 16, 2011

(65) Prior Publication Data

US 2012/0320471 A1    Dec. 20, 2012

(51) Int. Cl.
*G11B 5/596* (2006.01)
*G11B 20/18* (2006.01)
*G11B 5/55* (2006.01)
*G11B 19/04* (2006.01)

(52) U.S. Cl.
CPC ............ *G11B 19/042* (2013.01); *G11B 5/5582* (2013.01); *G11B 5/59694* (2013.01)
USPC ................... 360/77.07; 360/77.02; 369/53.42

(58) Field of Classification Search
None
See application file for complete search history.

(56) References Cited

U.S. PATENT DOCUMENTS

| 7,515,373 | B1 | 4/2009 | Supino | |
| 7,633,704 | B2 * | 12/2009 | Supino et al. | 360/75 |
| 2007/0183076 | A1 * | 8/2007 | Baugh et al. | 360/75 |
| 2012/0220843 | A1 * | 8/2012 | Diab et al. | 600/324 |

OTHER PUBLICATIONS

North, et al., "Arithmetic Effects in Adaptive Lattice Filters," D6.10, CH2977.7/91/000, pp. 1917-1920 IEEE, 1991.

* cited by examiner

*Primary Examiner* — Andrew L Sniezek
(74) *Attorney, Agent, or Firm* — Braden Katterheinrich (57) ABSTRACT

An implementation of a circuit disclose herein comprises a vibration sensor circuit that generates a sensor signal from a disturbance signal, a lattice filter circuit that decorrelates the sensor signal to generate orthogonal backward prediction errors, and a multiple regression filter that estimates a disturbance correction signal using the orthogonal backward prediction errors.

18 Claims, 7 Drawing Sheets

ADAPTIVE LATTICE PREDICTIVE FILTER

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An implementation of a circuit disclosed herein comprises a vibration sensor circuit that generates a sensor signal from a disturbance signal, a lattice filter circuit that decorrelates the sensor signal to generate orthogonal backward prediction errors, and a multiple regression filter that estimates a disturbance correction signal using the orthogonal backward prediction errors.

These and various other features and advantages will be apparent from a reading of the following detailed description.

DETAILED DESCRIPTIONS

Data storage devices such as disk drive include a plurality of recording disks, which are mounted to a rotatable hub of a spindle motor and rotated at a high speed. An array of read/write heads is disposed adjacent to surfaces of the disks to transfer data between the disks and a host device. The heads can be radially positioned over the disks by a rotary actuator and a closed loop servo system. The servo system can operate in two primary modes: seeking and track following. During a seek operation, a selected head is moved from an initial track to a target track on the corresponding disk surface. Upon reaching the target track, the servo system enters the track following mode wherein the head is maintained over the center of the target track while data is written/read. During track following, prerecorded servo information sensed by the head is demodulated to generate a position error signal (PES), which provides an indication of the position error of the head away from a desired location along the track (e.g., the track center). The PES is then converted into an actuator control signal, which is fed back to a head actuator that positions the head.

As the areal density of magnetic disc drives increases, so does the need for more precise position control when track following, especially in the presence of external vibrations which can cause non-repeatable runout (NRRO) of the position error. Disk drives are being incorporated into increasingly diverse types of electronic devices having widely varying vibrational characteristics. For example, disk drives utilized in music and video playback/recording devices can be subjected to speaker induced vibration. Such speaker induced vibration can exceed the track following capabilities of the servo control loop and result in disruption of the music and video stream and associated skipping and/or stalling of the music and video playback/recording and/or failure of the device operation system. The impact of the external disturbance on functioning of the storage devices are more pronounced in the newer storage device applications, which present additional challenges due to dynamic and varying environment conditions. Furthermore, as the chassis of such storage devices becomes thinner and lighter, there is higher need for more precise positioning control in the storage devices for improved track positioning in presence of such external disturbances.

Figure 1:
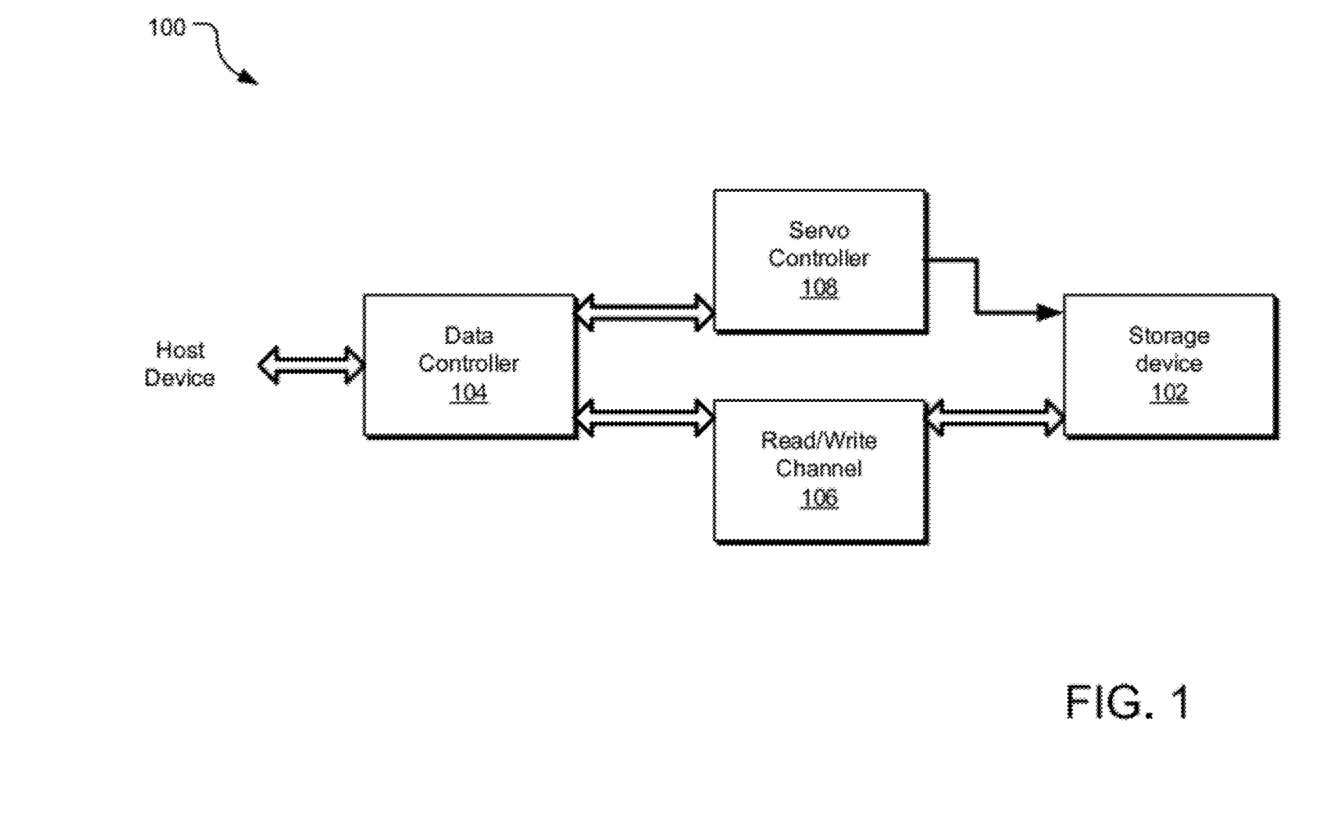
FIG. 1 illustrates an example block diagram of data storage system.

FIG. 1 is an example block diagram of storage system 100. The storage system 100 receives data and instructions from a host device and it communicates with and controls a storage device 102. Examples of the host devices include, without limitation, a desktop computer, a laptop computer, a personal digital assistant (PDA), a digital video recorder/player, a digital music recorder/player, a smart-phone, and/or another electronic devices that are communicatively connected to the storage device 102. Examples of the storage device 102 includes a hard disc drive such as an optical disc drive or a magnetic disc drive, a solid state storage system, etc.

The storage system 100 includes a data controller 104 that buffers write and read commands from the host device and associated data. In one implementation, the data controller 104 carries out buffered write commands by formatting the associated data into blocks with appropriate header information, and transfers the formatted data via a read/write channel 106 to logical block addresses (LBAs) on a disk in the storage device 102 as identified by the associated write command.

The storage system 100 also includes a servo controller 108 that provides servo control of the storage device 102. Although FIG. 1 shows two separate controllers 104, 108 and a read write channel 106 as separate blocks for purposes of illustration and discussion, it is to be understood that their functionality described herein may be integrated within a common integrated circuit package or distributed among more than one integrated circuit package. In one implementation, the storage device 102 can include a head disk assembly (HDA) having a plurality of data storage disks, a plurality of heads mounted to respective arms and which are moved radially across different data storage surfaces of the disks by a head actuator (e.g., voice coil motor), and a spindle motor which rotates the disks.

The read write channel 106 converts data between the digital signals processed by the data controller 104 and the analog signals conducted through the heads in the storage device 102. In one example implementation, the read write channel 106 provides servo data read from the storage device 102 to the servo controller 108. The servo data is used to detect the location of a head in the storage device 102 in relation to LBAs on a disk of the storage device 102. The servo controller 108 uses LBAs from the data controller 104 and the servo data to seek the head to an addressed track and block on the disk within the storage device 102, and to maintain the head aligned with the track while data is written/read on the disk.

In one implementation, the servo controller 108 provides an adaptive feed-forward control scheme that utilizes an accelerometer signal to improve the capability of the servo control loop to reject external disturbances to the storage device 102. The servo controller may include an adaptive filter, such as an adaptive lattice filter, that responds to filter coefficients to filter an acceleration signal and to generate a feed-forward signal that controls a head actuator of the storage device 102 to counteract disturbances to the storage device 102 caused by vibration.

In one example implementation, the filter coefficients are tuned using an adaptive lattice filter algorithm. The servo controller 108 attempts to adapt the adaptive lattice filter algorithm to match the unknown disturbance dynamic effects on the servo control loop, and so that the coefficients of the adaptive lattice filter are thereby tuned to cause the feed-forward signal to cancel the deleterious effects of the external disturbances on head position of the storage device 102.

In an example implementation, the adaptive lattice filter within the servo controller 108 has a modular structure including a series of cascaded lattice stages. A first stage of such an adaptive lattice filter receives as input a sensor signal. Each stage of the lattice prediction filter generates a forward prediction error and a backward prediction error. The subsequent stages after the first stage of the adaptive lattice filter receive outputs from a previous stage as inputs thereof. Furthermore, the backward prediction error output from each stage is also input to a corresponding stage of a multiple regression filter, wherein the multiple regression filter estimates a disturbance correction signal using the backward prediction error. In one implementation, the backward prediction error input to a corresponding stage of the multiple regression filter is weighted by an appropriate weight that are adaptively revised based on, among other things, an error signal of a previous stage.

Each stage of the adaptive lattice filter filters the input signal to generate a forward prediction error signal and a backward prediction error signal. The reflection coefficients applied to each of a plurality of lattice stages are adaptively calculated/tuned as a function of an input forward prediction error and a delayed backward prediction error input to the respective lattice filter stage, which minimizes the mean square error (MSE) of the forward prediction error and the backward prediction error for the respective stage.

Each stage of the adaptive lattice filter decorrelates the forward prediction error input for that respective stage to generate an orthogonal, and thus completely uncorrelated, backward prediction error signal. In one implementation, such orthogonal backward prediction error signal spans the same space as the sensor signal. Such orthogonal backward prediction error output is weighted and input to a respective stage of a multiple regression filter. The final output of the multiple regression filter and the outputs of the final stage of the adaptive lattice filter are used to generate a disturbance correction signal. In one implementation, the lattice stage error from each stage of the adaptive lattice filter is evaluated to determine if it is necessary to add an additional stage of adaptive lattice filter.

Figure 2:
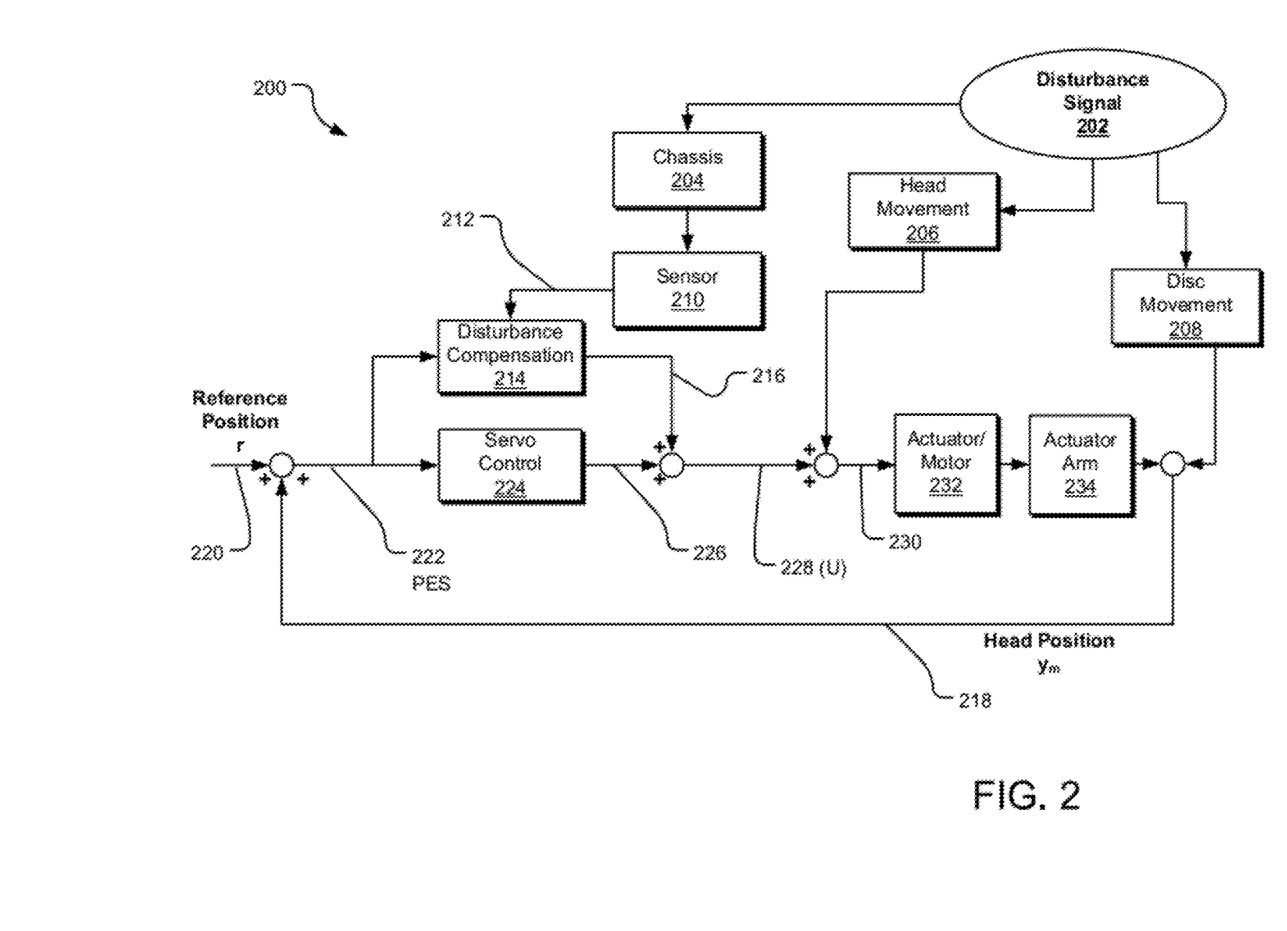
FIG. 2 illustrates an example block diagram of a servo control loop.

FIG. 2 illustrates a block diagram of a servo control loop 200. The servo control loop 200 illustrated in FIG. 2 is implemented within a servo controller of a storage device, such as the servo controller 108. However, in alternate implementations the servo control loop 200 can also be implemented in other systems for generating external disturbance compensation signals. The servo control loop 200 receives a number of external disturbance signals 202. For example, one such external disturbance signal is generated through the movement 204 of the chassis of a storage device. The transfer function of the disturbance signal generated through the movement 204 of chassis 204 is generally unknown. Similarly, head movement 206 of the disc head of a storage device relative to the disc of the storage device, or the disc movement 208 of the disc of a storage device relative to the disc head of the storage device also generates disturbance signals. The servo control loop 200 generates compensation signals for the disturbance signals generated by one or more of the movements 204, 206, 208. While only three different disturbance signals are discussed herein, the servo control loop can also be designed to generate compensation signals for other disturbance signals.

In one implementation, the sensor 210 generates a signal disturbance 212 based on a disturbance in the chassis of a storage device. The disturbance signal 212 is input to a disturbance compensation module 214 that generates a disturbance compensation signal 216. The position $y_m$ 218 of the head relative to a given track on a disc of a storage device is sensed and compared to a reference position input r 220 of the head to generate a position error signal (PES) 222. Thus, the PES is indicative of the difference between the actual and desired positions of the head (i.e., head position error), and is provided to a servo control module 224. The servo control module 224 responds to the value of PES 222 to generate a servo control signal 226.

The servo control signal 226 is combined by a combination module (not shown) with the compensation signal 216 to generate a combined control signal U 228. In one implementation, the combined control signal U 228 is converted by a digital to analog converter (DAC) and a power amplifier (PA) (both not shown) into an analog signal. The analog signal is amplified and combined with an output from a head movement sensor 206 to generate an input signal 230 for an actuator/motor 232. The head actuator motor 232 is connected to an actuator that moves an actuator arm 234.

The disturbance compensation module 214 responds to the disturbance signal 212 by generating a compensation signal 216 to counteract the disturbance caused by external disturbance signal 202. In one implementation, the disturbance compensation module 214 includes an adaptive lattice filter to generate the compensation signal 216 based on the disturbance signal 212. The adaptive lattice filter used in the disturbance compensation module 214 may include a cascade of lattice filters wherein each stage of the cascade of lattice filters generates a forward prediction error signal and an orthogonal backward prediction error signal. Furthermore, the disturbance compensation module 214 also includes a multiple regression filter with a plurality of stages such that each stage of the multiple regression filter corresponds to a respective stage of the adaptive lattice filter.

The orthogonal backward prediction error output from a respective stage of the adaptive lattice filter is input to a corresponding stage of the multiple regression filter. The respective stage of the multiple regression filter estimates a disturbance correction signal using the orthogonal backward prediction error input.

Figure 3:
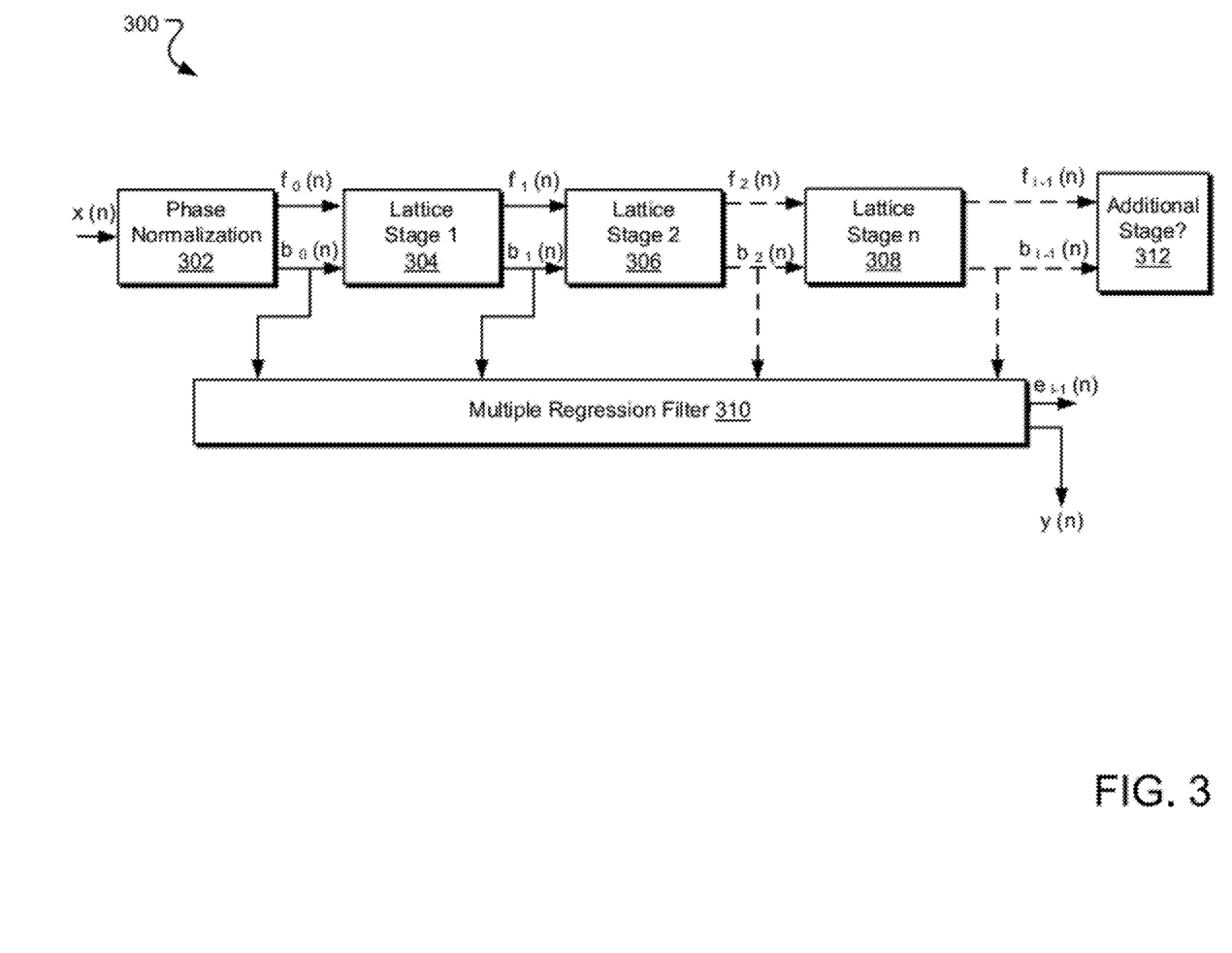
FIG. 3 illustrates an example block diagram of an adaptive lattice filter.

FIG. 3 illustrates an example implementation of a disturbance compensation module 300 to generate a disturbance correction signal based on a sensor signal. Specifically, the disturbance compensation module 300 uses an adaptive lattice filter having a cascade of lattice stages together with a multiple regression filter.

The disturbance compensation module 300 receives a sensor signal x(n) as an input. A phase normalization filter 302 normalizes the phase of the sensor signal x(n) as necessary. Note that the phase normalization filter 302 is not always required, and it is generally used to take away some of the workload from the subsequent adaptive lattice filter stages. The output of the phase normalization filter 302 is input to a lattice stage 1 304. Specifically, the output of the phase normalization filter 302 is input as forward prediction error signal $f_0(n)$ and orthogonal backward prediction error signal $b_0(n)$ into the lattice stage 1 304. The lattice stage 1 304 generates as output forward prediction error signal $f_1(n)$ and orthogonal backward prediction error signal $b_1(n)$. The prediction error signals output from each adaptive lattice filter stage are input to the subsequent lattice stage.

Furthermore, the orthogonal backward prediction error signal $b_i(n)$ from each adaptive lattice filter stage is also input to a multiple regression filter 310. The multiple regression filter 310 is designed such that it has a number of regression stages corresponding to the lattice stage 302-308. Each stage of the multiple regression filter 310. In one implementation, a weighted value of the orthogonal backward prediction error signal $b_i(n)$ from each adaptive lattice filter stage are also input to a multiple regression filter 310 and each of the multiple regression filter stages generates a lattice stage error $e_i(n)$.

The disturbance compensation module 300 is illustrated to have n lattice stages, wherein n is selected based on the output of a corresponding stage of the multiple regression filter 310. The number of stages used for the disturbance compensation module 300 is determined based on analysis of a lattice stage errors $e_i(n)$ from the regression filter stage corresponding to various lattice stages. For example, if the relative value of lattice stage error $e_i(n)$ from a given lattice stage is large, an additional lattice stage may be added to further reduce the forward prediction error. However, if the incremental reduction of the lattice stage error by adding a lattice stage is minimal, a lattice stage may be removed.

The disturbance compensation module 300 also includes an additional stage determination module 312 that is adapted to receive the forward prediction error signal $f_{l-1}(n)$ and the backward prediction error signal $b_{l-1}(n)$ from the last lattice stage. The additional stage determination module 312 analyzes the forward prediction error signal $f_{l-1}(n)$ and the backward prediction error signal $b_{l-1}(n)$ to determine if it is beneficial to add an additional stage of the lattice predictor filter. Specifically, the additional stage determination module 312 compares the MSE of the forward prediction error signal $f_{l-1}(n)$ and the backward prediction error signal $b_{l-1}(n)$ to a threshold and if the MSE is higher than the threshold, it signals that it is beneficial to add an additional stage. However, if such MSE is lower than the threshold, it generates a signal that adding a stage is not beneficial.

Figure 4:
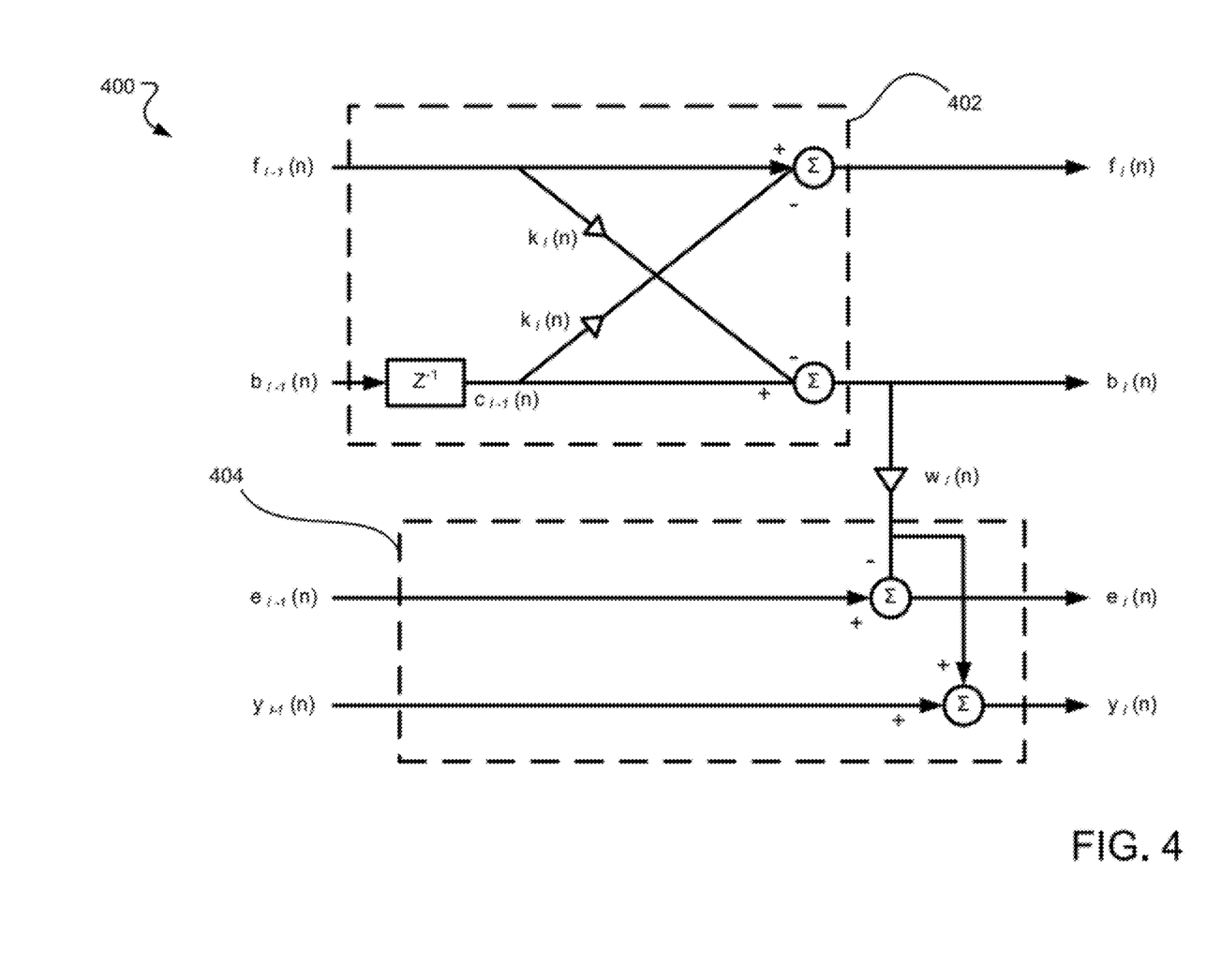
FIG. 4 illustrates an example detailed block diagram of one stage of an adaptive lattice filter.

FIG. 4 discloses an example implementation 400 of a stage of adaptive lattice filter. Specifically, FIG. 4 illustrates an adaptive lattice filter stage 402 together with a regression stage 404 of a multiple regression filter. The example lattice stage 402 receives forward prediction error signal $f_{l-1}(n)$ and a backward prediction error signal $b_{l-1}(n)$ from a prior lattice stage. An adaptive lattice filter attempts to decompose an input reference sequence into an orthogonal, and thus completely unrelated residual sequence. A single lattice filter stage, such as the lattice filter stage 402 is represented by the following equations:

| Equation | No. |
|---|---|
| $f_l(n) = f_{l-1}(n) - k_l(n) * c_{l-1}(n), l = 1, 2, \ldots, L-1$ | 1 |
| $b_l(n) = c_{l-1}(n) - k_l(n) * f_{l-1}(n), l = 1, 2, \ldots, L-1$ | 2 |
| $k_l(n+1) = k_l(n) + \eta_l(n) * [f_l(n) * c_{l-1}(n) + c_l(n)f_{l-1}(n)]$ | 3 |
| $\eta_l(n) = \dfrac{\eta}{\hat{P}_l(n)}, 0 < \eta < 1$ | 4 |
| $\hat{P}_l(n) = \gamma \hat{P}_l(n-1) - (1-\gamma)[f\hat{\gamma}(n) - c\hat{\gamma}(n)]$ where $0 < \gamma \ll 1$ | 5 |
| $w_l(n+1) = w_l(n) + \mu_l(n) * b_l(n) * e_l(n)$ | 6 |
| $\mu_l(n) = \dfrac{\mu}{\hat{Q}_l(n)}, 0 < \mu < 1$ | 7 |
| $\hat{Q}_l(n) = (1-\beta)\hat{Q}_l(n-1) + \beta b_l^2(n), 0 < \beta \ll 1$ | 8 |
| $y(n) = \sum_{i=c}^{L-1} w_l(n)b_l(n)$ | 9 |
| $\text{InvPwr}(n) = \dfrac{1}{B} \times \text{InvPwr}(n-1) \times \left[1 - \min\left\{\varepsilon, \dfrac{1-B}{B} \times (f_1(n-1)^2 - (b_1(n-1))^2) \times \text{InvPwr}(n-1)\right\}\right]$ where $\epsilon < 1$ and $B = 1 - \eta$ | 10 |

Here the $k_l$ represents the reflection coefficients for the lattice stage l. the $f_l(n)$ represents the forward, prediction error of the $l^{th}$ stage, $b_l(n)$ represents the backward prediction error of the $l^{th}$ stage, and $e_l(n)$ represents the lattice stage error of the $l^{th}$ stage. The value of the $e_l(n)$ can be evaluated to determine if it is necessary to add an additional lattice stage to achieve the desired level of disturbance compensation. Furthermore, while the reflection coefficients $k_l$ are illustrated to be same for the each of the forward prediction error and backward prediction error branches, in an alternate implementation, value for each of these two branches may be different. Finally, the $y_l(n)$ output from the $l^{th}$ stage of the regression filter represents the filtered output from the $l^{th}$ stage.

Note that the adaptive calculation of reflection coefficients $k_l$ requires calculation of a large power operation in the denominator of equation 4. In one implementation, to avoid computation of such time-consuming division operation, the denominator of equation 4 is estimated using the inverse power equation 10 above. A similar inverse power equation can also be employed to remove the division operation for the multiple regression coefficient update in equation 7.

Figure 5:
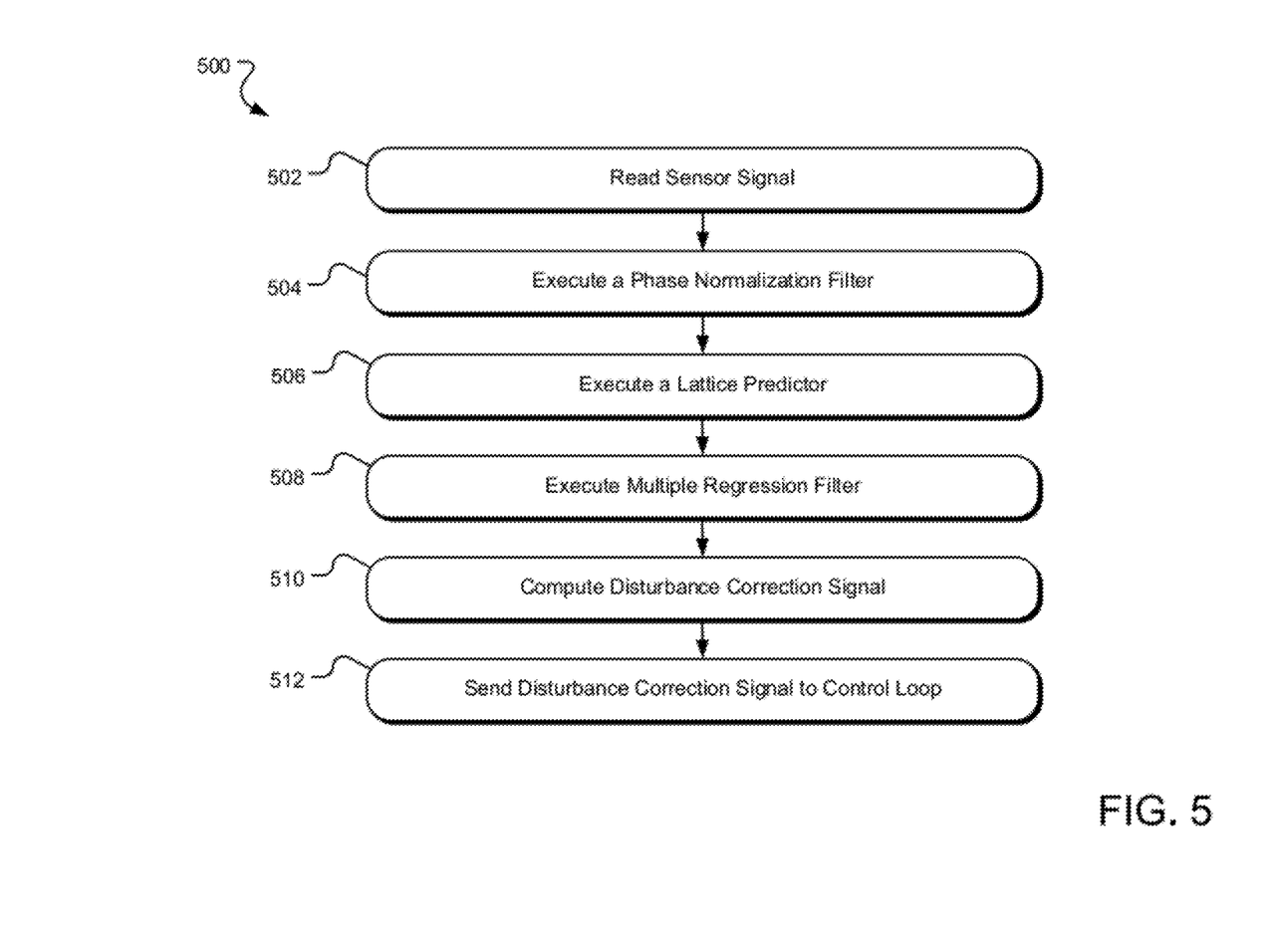
FIG. 5 illustrates an example flowchart for generating disturbance correction signal for a servo control loop.

FIG. 5 illustrates an example flowchart 500 of operations used to generate and use a disturbance correction signal for a servo control loop. Specifically, the operations of flowchart 500 are implemented using, among other things, the adaptive lattice filter disclosed herein. A block 502 reads a sensor signal. In one implementation, the sensor signal represents a disturbance signal generated due to mechanical disturbance experience by chassis of a storage device, by the movement of the head of a storage device, by the movement of one or more discs of a storage device, etc. Subsequently, a block 504 executes a phase normalization filter by applying the sensor signal to the phase normalization filter. The executing operation 504 normalizes the phase of the sensor signal x(n) as necessary. Note that the executing operation 504 is not always required, and it is generally used to take away some of the workload from the subsequent operations.

Subsequently, an executing operation 506 executes a lattice predictor filter on the signal output by the executing operation 504. The executing operation 506 can use a lattice predictor filter having multiple stages wherein each of the multiple stages generates a forward prediction error signal $f_l(n)$ and a backward prediction error signal $b_l(n)$, with the backward prediction error signal $b_l(n)$ being orthogonal and thus completely uncorrelated to the input signal for that stage. The executing operation 506 adaptively sets the reflection coefficients of each of the lattice predictor stage as a function of the forward prediction error and the backward prediction error bl-1(n) of the prior stage (see equation 3 above).

An executing operation 508 executes a multiple regression filter using the backward prediction error values of the lattice predictor. Each stage of the multiple regression error filter generates a lattice stage error $e_l$. In one implementation, the executing operation 508 uses a weighted value of the backward prediction error outputs $b_l(n)$ of the lattice predictor as input to the respective stage of the multiple regression filter. The amount of weight $w_l(n)$ applied to the backward prediction error outputs $b_l(n)$ of the lattice predictor is adaptively changed based on, among other things, backward prediction error outputs $b_l(n)$ of the previous stage and the lattice stage error of the previous stage $e_{l-1}$ (see equation 6 above).

An operation 510 computes a disturbance correction signal y(n) based on the summation of the regression coefficients $w_l(n)$ times the corresponding backward prediction error signals $b_l(n)$ (see equation 9 above). A sending operation 512 sends the disturbance correction signal to a servo control loop, such as a servo control loop of a data storage device.

Figure 6:
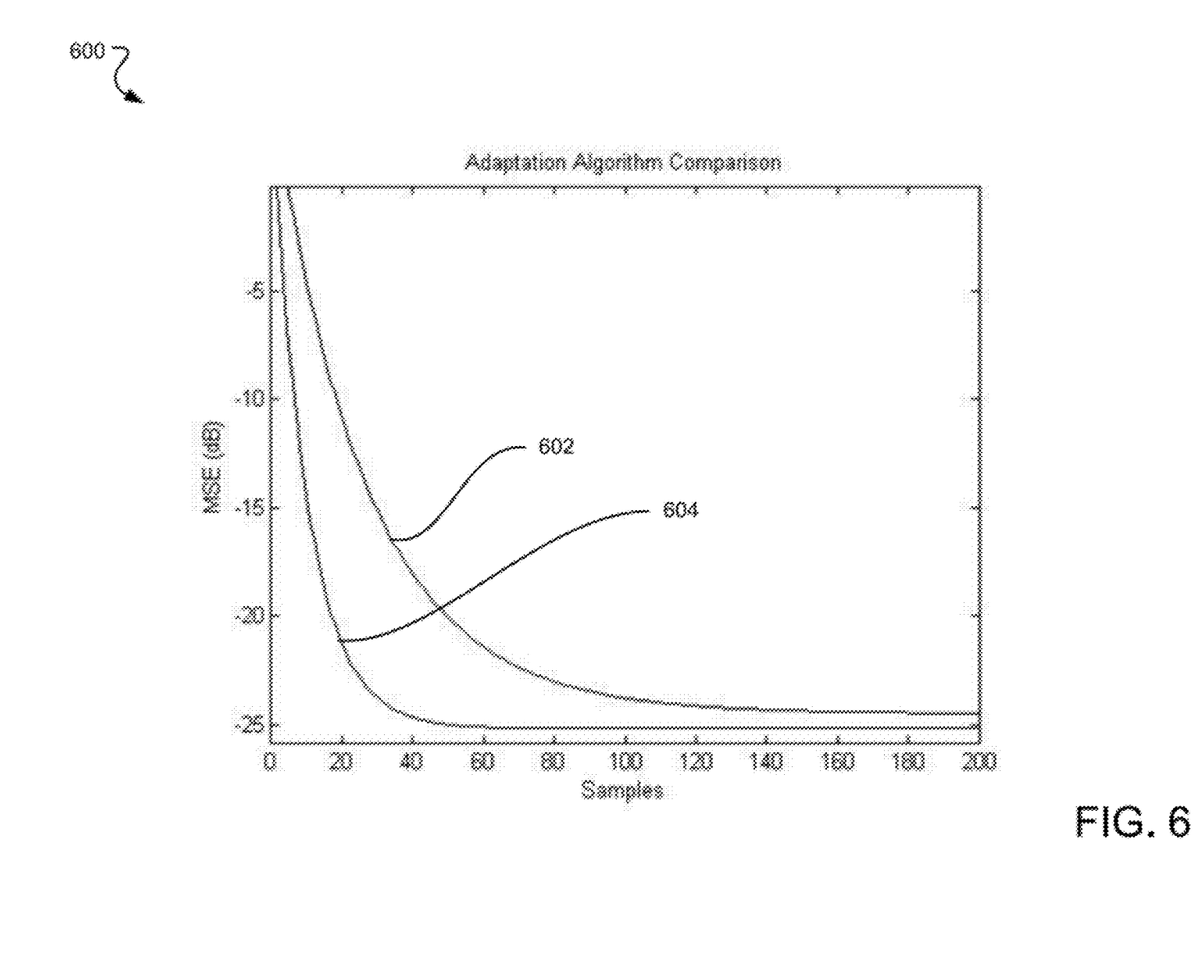
FIG. 6 illustrates comparative simulation results of mean square error (MSE) as a function of the number of samples captured and processed by a filter.

FIG. 6 discloses comparative simulation results 600 of mean square error (MSE) as a function of the number of samples captured and processed by a filter. Specifically, graph 602 discloses MSE as function of number of samples for a traditional filter, such as a finite impulse response (FIR) filter, wherein graph 604 discloses MSE as function of number of samples for an adaptive lattice filter disclosed herein. As shown in FIG. 6, for a given number of samples, using an adaptive lattice filter provides lower MSE. Alternately, for achieving the same amount of MSE, less number of samples is required when an adaptive lattice filter is used. Thus, as the number of samples is increased, an adaptive lattice filter provides faster reduction in the MSE.

Figure 7:
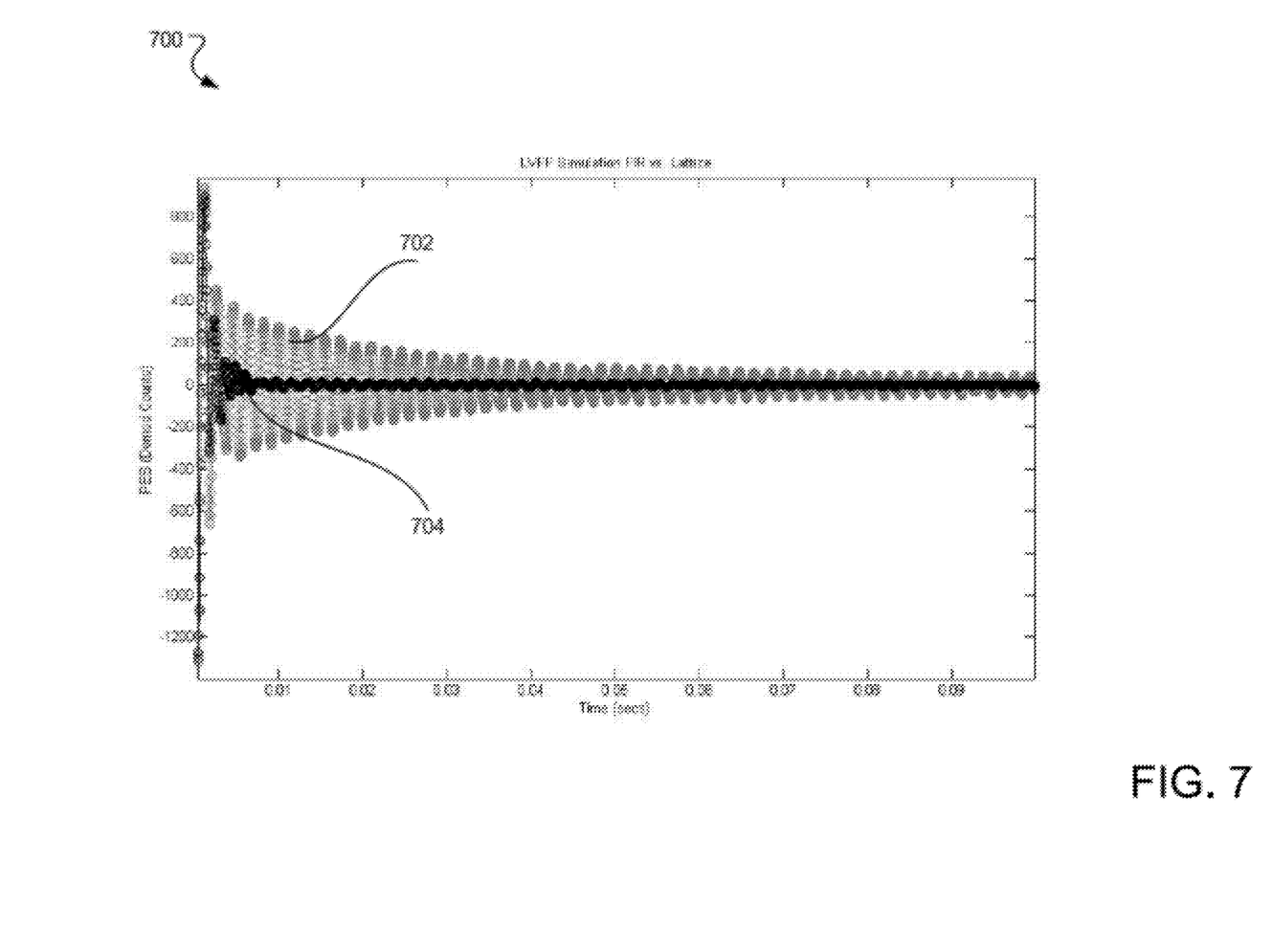
FIG. 7 illustrates comparative simulation results of position error signal (PES) in demodulator counts as a function of time.

FIG. 7 illustrates comparative simulation results 700 of position error signal (PES) in demodulator counts as a function of time in seconds when using traditional filter, such as a finite impulse response (FIR) filter and an adaptive lattice filter. Specifically, graph 702 is illustrates the PES as function of time using a finite impulse response (FIR) filter whereas graph 704 illustrates the PES as function of time using an adaptive lattice filter.

Although the block diagrams and flowcharts disclosed herein describe various embodiments in the context of storage devices for purposes of illustration and explanation, it is to be understood that the technology disclosed herein can be more broadly used for any type of servo control loop that can be subject to vibration.

In one implementation, the block diagrams and flowcharts disclosed above are implemented in hardware and/or in software (including firmware, resident software, micro-code, etc.). Furthermore, various implementations may take the form of a computer program product on a computer-usable or computer-readable storage medium having computer-usable or computer-readable program code embodied in the medium for use by or in connection with an instruction execution system. Accordingly, as used herein, the term "circuit" may take the form of digital circuitry, such as processor circuitry (e.g., general-purpose microprocessor and/or digital signal processor) that executes program code, and/or analog circuitry.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   decorrelating a sensor signal using a lattice filter to generate orthogonal backward prediction errors; and
   estimating a disturbance correction signal using the orthogonal backward prediction errors.

2. The method of claim 1, further comprising generating the sensor signal from a disturbance signal.

3. The method of claim 1, further comprising using the disturbance correction signal to generate a storage device control signal.

4. The method of claim 3, wherein the storage device control signal is a servo control signal for a disc drive.

5. The method of claim 1, further comprising generating a phase normalized sensor signal based on the sensor signal, wherein decorrelating the sensor signal comprises decorrelating the phase normalized sensor signal.

6. The method of claim 1, wherein decorrelating a sensor signal using a lattice filter comprises decorrelating a sensor signal using at least two lattice filters.

7. The method of claim 1, wherein the sensor signal is generated from a disturbance signal of a storage device.

8. The method of claim 7, wherein the storage device is a disc drive.

9. The method of claim 1, wherein decorrelating a sensor signal further comprises generating a forward predictor error signal.

10. The method of claim 9, further comprising:
generating a mean square error (MSE) of the forward prediction error signal and the orthogonal backward prediction error;
comparing the MSE to a threshold; and
if the MSE is above the threshold, further decorrelating the backward prediction errors.

11. The method of claim 1, wherein the estimating step includes using a multiple regression filter to estimate the disturbance correction signal.

12. The method of claim 11, wherein the generated orthogonal backward prediction errors are weighted before being inputted to a stage of the multiple regression filter.

13. The method of claim 1, wherein the lattice filter includes multiple stages, the method further comprising:
evaluating a lattice stage error from at least one of the multiple lattice filter stages to determine if an additional lattice filter stage is to be added.

14. A circuit comprising:
a sensor circuit that generates a sensor signal from a disturbance signal;
a phase-normalization filter that normalizes the phase of the sensor signal;
a lattice filter circuit that decorrelates the phase-normalized sensor signal to generate orthogonal backward prediction errors; and
a multiple regression filter that estimates a disturbance correction signal using the orthogonal backward prediction errors.

15. The circuit of claim 14 wherein the disturbance signal is an external disturbance signal from a storage device and wherein the disturbance correction signal is input to an actuator of the storage device.

16. The circuit of claim 14 wherein the sensor circuit generates a sensor signal from a disturbance signal generated by a chassis of a data storage device.

17. The circuit of claim 14, further comprising:
a comparator module adapted to generate a position error signal (PES) based on a reference position and a head position signal;
a servo control module adapted to generate a servo signal based on the PES;
a combination module adapted to combine the servo signal with the disturbance correction signal to generate a combined control signal; and
an actuator module adapted to generate an actuator signal to control an actuator arm of a disc drive using the combined control signal.

18. A servo control circuit, comprising:
a sensor circuit that generates a sensor signal from a disturbance signal related to a device;
a lattice predictor circuit comprising a plurality of lattice stages, wherein the lattice predictor circuit receives the sensor signal as an input and each stage of the plurality of lattice stages generates a backward prediction error;
a multiple regression filter comprising a plurality of regression stages, wherein the backward prediction error output from each stage of the plurality of lattice stages is input to a corresponding stage of the plurality of regression stages, and wherein the multiple regression filter generates a disturbance correction signal;
a combination module adapted to combine a servo signal with the disturbance correction signal to generate a combine control signal; and
an actuator module adapted to generate an actuator signal to control an actuator arm of a disc drive in response to the combined control signal.

* * * * *